United States Patent

[11] 3,609,428

[72] Inventors Herbert John Thomas Cotton
"Lea Mount" 195, Alcester Road, Hollywood;
Robert Hemmings, 49 Masters Lane, Halesowen, both of England
[21] Appl. No. 1,642
[22] Filed Jan. 9, 1970
[45] Patented Sept. 28, 1971
[32] Priority Jan. 13, 1969
[33] Great Britain
[31] 1880/69

[54] DYNAMO ELECTRIC MACHINE HAVING IMPROVED SLIPRING ASSEMBLY
5 Claims, 5 Drawing Figs.
[52] U.S. Cl. .................................................. 310/232, 310/68 D, 310/237
[51] Int. Cl. .................................................. H01v 39/06
[50] Field of Search .................................. 310/232–237, 238, 239, 219, 231, 242, 245, 247, 263, 265–268, 68, 68.4

[56] References Cited
UNITED STATES PATENTS

| | | | |
|---|---|---|---|
| 3,396,586 | 8/1968 | Maclin et al. | 310/232 X |
| 2,109,991 | 3/1938 | French | 310/219 |
| 3,295,046 | 12/1966 | Margaira | 310/68 X |
| 3,184,625 | 5/1960 | Farison | 310/231 X |
| 3,487,249 | 12/1969 | Nicholls et al. | 310/235 X |
| 3,041,484 | 6/1962 | Freer et al. | 310/68 |

Primary Examiner—Milton O. Hirshfield
Assistant Examiner—B. A. Reynolds
Attorney—Holman & Stern ABSTRACT: This invention relates to dynamo electric machines. The dynamo electric machine includes a frame which supports a pair of bearings. A rotor shaft is journaled for rotation in the bearings, and carries a rotor assembly. A slipring assembly is also carried by the rotor shaft, and a brush assembly is provided, the brushes of which engage the slipring assembly. One end of the rotor shaft extends beyond one of the bearings, and is formed with an axial bore. The slipring assembly includes an integral spigot which is engaged as an interference fit in the bore in the rotor shaft, the spigot serving to support the slipring assembly on the rotor shaft so that the slipring assembly rotates with the rotor shaft. The slipring assembly is electrically connected to the rotor windings by way of leads which extend through the bearing, and so rotate with the shaft.

DYNAMO ELECTRIC MACHINE HAVING IMPROVED SLIPRING ASSEMBLY

This invention relates to dynamo electric machines, of the kind including a frame supporting a pair of bearings, a rotor shaft journaled for rotation in said bearings and carrying a rotor assembly, a slipring assembly carried by the rotor shaft and a brush assembly, the brushes of which engage said slipring assembly.

According to the invention, in a machine of the kind specified one end of said rotor shaft extends beyond one of said bearings and is formed with an axial bore within which is engaged a spigot integral with said slipring assembly, said spigot serving to support said slipring assembly on said rotor shaft for rotation therewith and said slipring assembly being electrically connected to said rotor assembly by way of leads which extend through said bearing so as to rotate with the shaft.

Figure 1:
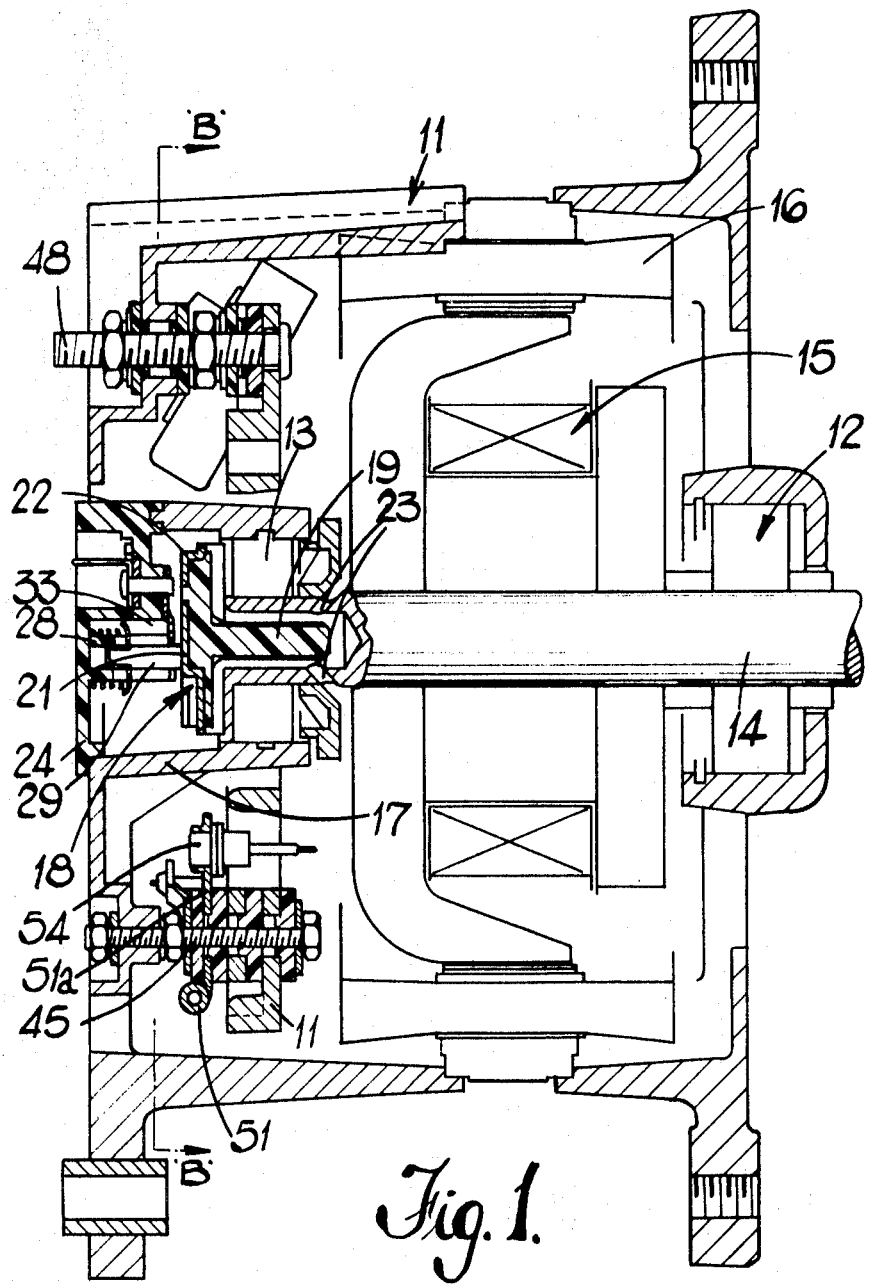
Figure 2:
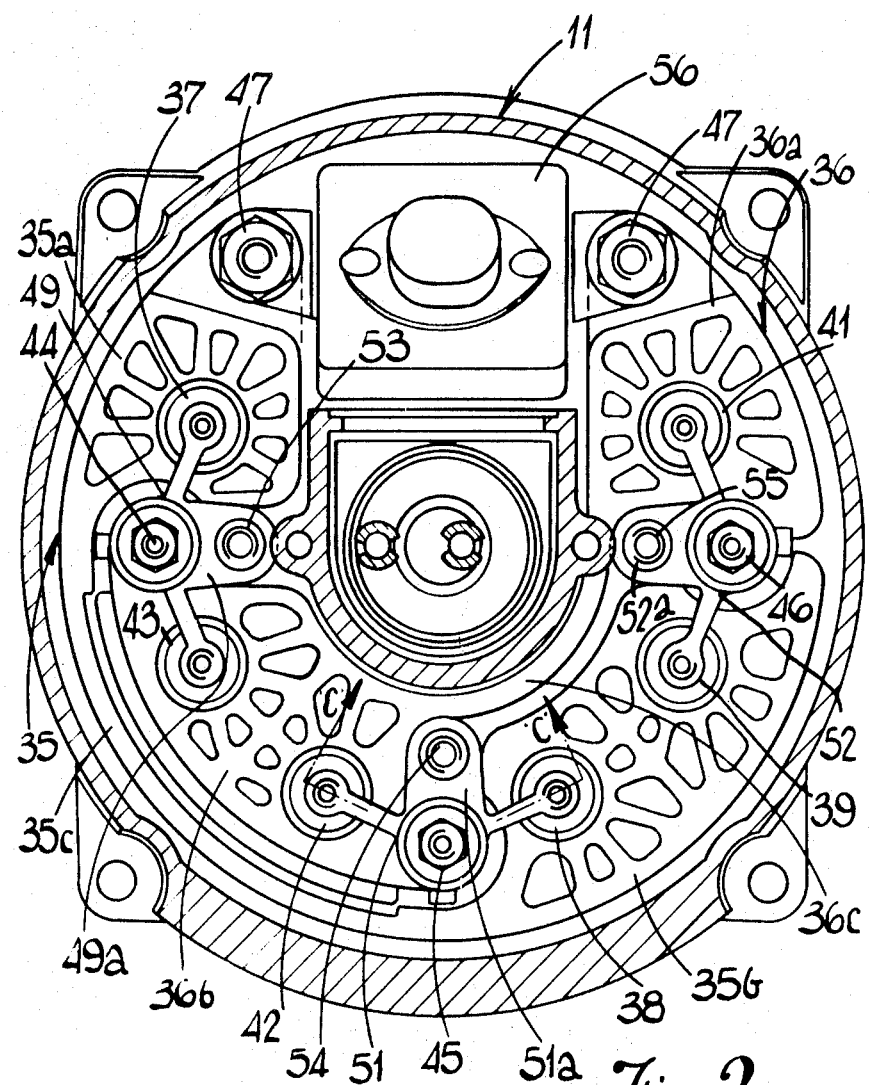
Figure 3:
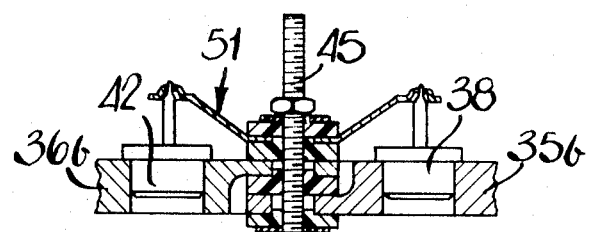
Figure 4:
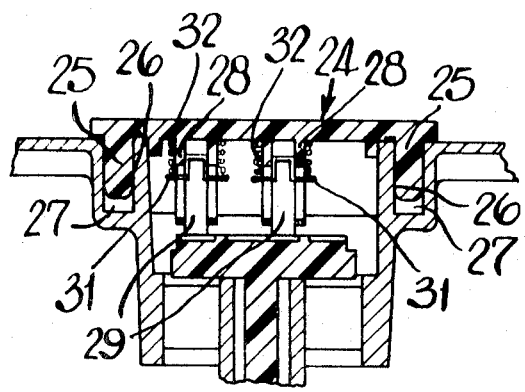
Figure 5:
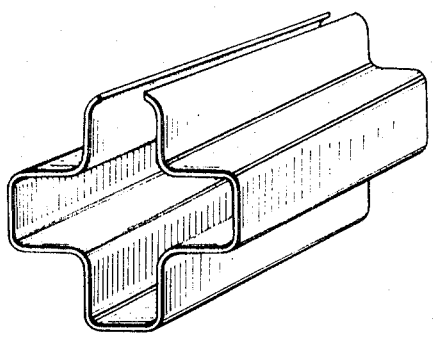

One example of the invention is illustrated in the accompanying drawings wherein:

FIG. 1 is a sectional view of an alternator,
FIG. 2 is a sectional view on the line B—B in FIg. 1,
FIG. 3 is a sectional view on the line C—C in FIG. 2,
FIG. 4 is a sectional view of the brush assembly shown FIG. 1 and
FIG. 5 is a prospective view of a slipring retaining clip.

Referring to the drawings, the alternator includes a frame 11 carrying first and second bearing assemblies 12, 13. Journaled for rotation in the bearing assemblies 12, 13 is a rotor shaft 14 which carries intermediate its ends, between the bearing assemblies 12, 13, a rotor assembly 15. The rotor assembly 15 includes a pair of pole pieces on each side of a core carrying a rotor winding, and the rotor assembly 15 is rotatable with the shaft 14, within a stator assembly 16 carried by the frame 11. The shaft 14 projects at one end from the bearing assembly 12 and is adapted to receive a fan, and a pulley through which the rotor shaft is driven. At its opposite end, the rotor shaft 14 projects from the bearing assembly 13, the rotor shaft 14 terminating within a generally cylindrical portion 17 of the frame 11. The end of the rotor shaft 14 remote from the bearing assembly 12 is formed with a cylindrical bore within which is received a spigot 19 integral with a slipring unit 18. The slipring unit 18 includes a mounded body including a plain circular face extending in a plane at right angles to the axis of the shaft 14. Said face of the moulded body of the slipring unit 18 includes a central conductive disc 21 which lies within a conductive annulus 22, the disc 21 being insulated from the annulus 22. The disc 21 is concentric with the annulus 22, and the disc 21 and the annulus 22 constitute the brush engaging surfaces of the slipring unit. The spigot 19 of the slipring unit 18 is of cruciform cross section, and is received as an interference fit in the bore in the rotor shaft 14, so that the slipring unit 18 rotates with the rotor shaft 14. A spring clip (not shown) is engaged between the spigot 19 and the wall of the bore in the shaft 14, and aids the interference fit between the spigot 19 and the wall of the bore in the shaft 14, in maintaining the slipring unit 18 in engagement with the shaft 14. Since the bore in the shaft 14 is cylindrical, and the spigot 19 is of cruciform cross section, then four equiangularly spaced passages are defined between the spigot 19 and the wall of the bore shaft 14. A pair of connecting leads are provided for electrically interconnecting the annulus 22 and the disc 21 of the unit 18 to the rotor winding, and these leads extend through the bearing assembly 13 along a diametrically opposite pair of the passages defined between the wall of the bore in the shaft 14 and the spigot 19. At the side of the bearing 13 adjacent the rotor assembly 15, that is to say the side remote from the unit 18, the leads extend through respective passages 23 through which the cylindrical bore in the shaft 14 communicates with the exterior of the shaft.

The provision of a face-type slipring assembly which is secured to the rotor shaft by engaging a spigot integral with the slipring assembly in a bore in the shaft enables the overall length of the alternator to be kept to a minimum.

The inner end of the portion 17 of the frame 11 is closed by bearing assembly 13, and the outer end of the portion 17 is closed by a moulded synthetic resin brush box 24. The brush box 24 is engaged as an interference fit with the frame 11, the brush box 24 including a pair of spigots 25 which carry spring clips 26 and which are received as a push fit in corresponding bores 27 in the frame 11 adjacent the portion 17 of the frame 11 (FIG. 4). The brush box 24 includes a pair of integral hollow spigots 28 which extend towards the slipring unit 18, and which receive respective brushes 29. The brushes 29 include respective conductive carriers 31 which extend through slots in the walls of the spigots 28 and which serve to guide the brushes 29 for sliding movement in the spigots 28. The brushes are urged into engagement with the annulus 22 and the disc 21 of the slipring unit 18 respectively, by respective compression springs 32 which act between the carriers 31 and the brush box 24. Each of the carriers 31 has electrically connected thereto a conductive braid 33 which is electrically connected to a respective terminal secured to the exterior of the brush box 24. Thus, the slipring unit and brushes of the alternator are completely enclosed by a housing defined by the bearing assembly 13, the portion 17 of the frame and the brush box 24.

The alternator is a three-phase alternator, and is provided with a full wave rectifier. The full wave rectifier includes a pair of arcuate terminal plates 34, 35 each of which includes a pair of portions indicated by the suffixes a and b which are interconnected by a conductive integral neck indicated by the suffix c. The plates 35, 36 are arranged with the portion 35b of the plate 35 between the portions 36a, 36b of the plate 36, and the portion 36b of the plate 36 between the portions 35a, 35b of the plate 35. The plate 35 carries three diodes 37, 38, 39, with their anodes electrically connected to the plate 35 and in heat exchange relationship therewith. The diode 37 is carried by the portion 35a of the plate 35 while the diodes 38, 39 are carried by the portion 35b of the plate 35. Similarly, the plate 36 carries three diodes 41, 42, 43 with their cathodes electrically connected to the plates 36, and in heat exchange relationship therewith, the diode 41 being carried by the portion 36a of the plate 36 while the diodes 42, 43 are carried by the portion 36b of the plate 36. The portion 36a of the plate 36 includes a lug which overlaps a corresponding lug at one end of the portion 35b of the plate 35, at its opposite end the portion 35b of the plate 35 includes a lug which overlaps a corresponding lug at one end of the portion 36b of the plate 36, and at its other end the portion 36b of the plate 36 includes a lug which overlaps a corresponding lug on the portion 35a of the plate 35. The plates 35, 36 are secured to one another by means of bolts 44, 45, 46 which extend through the lugs of the plates 35, 36 respectively. The lugs of the plates 35, 36 are insulated from one another by insulating washers, and the bolt 45 is insulated from both of the plates 35, 36. The bolt 45 physically connects the plates 35, 36 to the frame 11 of the alternator and a further pair of bolts 47 connected to but insulated from the plates 35, 36 respectively aid the bolt 45 in securing the plates 35, 36 to the frame 11. The bolt 44 is electrically connected to the plate 35, but insulated from the plate 36, while the bolt 46 is electrically connected to the plate 36 but insulated from the plate 35. Thus, the bolts 44, 46 constitute the positive and negative output terminals of the alternator respectively. Each of the diodes is supported on a part of the respective portion of the plates 35, 36 and is surrounded by passages through which air flows in use to aid cooling of the diodes. The plates 35, 36 are formed from relatively thick material, and so constitute heat sinks for the diodes, and are so shaped that the diodes 37, 38, 39, 41, 42, 43 lie substantially in the same plane.

The full wave rectifier further includes three phase plates 49, 51, 52, each of which is stamped from copper sheet. The phase plates 49, 51, 52 are supported by the bolts 44, 45, 46 respectively and are insulated therefrom. Each of the phase plates includes a center region which is mounted on but insulated from the respective bolts, 44, 45, 46 and extending from the central region of each of the phase plates, in opposite directions, is a pair of integral arms. One arm of the phase plate 49 is electrically connected to the cathode of the diode 37, while the other arm of the phase plate 39 is connected to the anode of the diode 43, one arm of the phase plate 51 is electrically connected to the anode of the diode 42, while the other arm thereof is connected to the cathode of the diode 38, and one arm of the phase plate 52 is electrically connected to the cathode of the diode 39 while the other arm thereof is electrically connected to the anode of the diode 41. Moreover, the central region of each of the phase plates 49, 51, 52 includes a terminal which receives a lead whereby the phase plate is electrically connected to the phase winding of the stator of the alternator. Each of the phase plates 49, 51, 52 includes a diode supporting region indicated by the suffix *a*. The regions 49*a*, 51*a*, 52*a* of the phase plates carry respective field diodes 53, 54, 55 with their anodes electrically connected to the regions 49*a*, 51*a*, 52*a* respectively.

The bolts 47 further serve to mount a voltage regulator 56 within the confines of the frame 11, and the necessary electrical connections between the terminals of the brushes 29, the cathodes of the field diodes 53, 54, 55 and the voltage regulator 56 are made by way of conductive leads.

It will be appreciated that since the brush box 24 is engaged as a push fit with the frame 11, then it can be easily detached to facilitate replacement of the brushes 29.

Having thus described our invention what we claim as new and desire to secure by Letters Patent is:

1. A dynamo electric machine, including, a frame supporting a pair of bearings, a rotor shaft journaled for rotation in said bearings, and carrying a rotor assembly, one end of said rotor shaft extending beyond one of said bearings, and carrying a slipring assembly, there being a brush assembly supported by the frame of the machine, the brushes of the brush assembly engaging said slipring assembly, said one end of said rotor shaft being formed with an axial bore of generally cylindrical form, and said slipring assembly including a spigot which is engaged in said bore to retain said slipring assembly on said shaft, said spigot being so shaped that at least one passage is defined between the spigot and the wall of the bore in the rotor shaft, at least one of the connecting leads of the slipring assembly extending through said bearing within said passage.

2. A machine as claimed in claim 1 wherein said bore is of circular cross section and said spigot is of cruciform cross section so as to define four passages with the wall of said bore, two connecting leads of the slipring assembly extending through said bearing within two of said passages respectively.

3. A machine as claimed in claim 1 wherein said slipring assembly is an end face slipring assembly.

4. A machine as claimed in claim 1 wherein said spigot is an interference fit in said axial bore, and there is provided a spring clip which engages said spigot and the wall of said bore, and aids the interference fit between the spigot and the wall of the bore in retaining the slipring assembly in position.

5. A dynamo electric machine including a frame supporting a pair of bearings, a rotor shaft journaled for rotation in the bearings and carrying a rotor assembly, one end of said rotor shaft extending beyond one of said bearings, and carrying a slipring assembly, there being a brush assembly supported by the frame of the machine, the brushes of the brush assembly engaging said slipring assembly, said one end of said rotor shaft being formed with an axial bore of generally cylindrical form, and said slipring assembly including a spigot which is engaged in said bore to retain said slipring assembly on said shaft, said spigot being so shaped that at least one passage is defined between the spigot and the wall of the bore in the rotor shaft, at least in accordance with said output.